US010083157B2

(12) United States Patent
Strope et al.

(10) Patent No.: US 10,083,157 B2
(45) Date of Patent: Sep. 25, 2018

(54) TEXT CLASSIFICATION AND TRANSFORMATION BASED ON AUTHOR

(71) Applicant: GOOGLE LLC, Mountian View, CA (US)

(72) Inventors: Brian Patrick Strope, Palo Alto, CA (US); Matthew Steedman Henderson, Edinburgh (GB)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/229,743

(22) Filed: Aug. 5, 2016

(65) Prior Publication Data
US 2017/0039174 A1     Feb. 9, 2017

Related U.S. Application Data

(60) Provisional application No. 62/202,601, filed on Aug. 7, 2015.

(51) Int. Cl.
*G06F 17/21*     (2006.01)
*G06F 17/22*     (2006.01)
(Continued)

(52) U.S. Cl.
CPC .......... *G06F 17/2264* (2013.01); *G06F 17/24* (2013.01); *G06F 17/274* (2013.01);
(Continued)

(58) Field of Classification Search
CPC .... G06F 17/2264; G06F 17/24; G06F 17/274; G06F 17/28; G06F 17/30705; G06N 3/08; G06N 3/0454
(Continued)

(56) References Cited

U.S. PATENT DOCUMENTS 8,903,719 B1 *  12/2014  Landry ................... G06F 17/21
                                                       704/10
8,935,154 B1 *   1/2015  Satish ..................... G06F 17/27
                                                       704/1
(Continued)

OTHER PUBLICATIONS

Khosmood et al., "Automatic Synonym and Phrase Replacement Show Promise for Style Transformation", published Dec. 2010, published by IEEE 2010 Ninth International Conference on Machine Learning and Applications, pp. 958-961.*
(Continued)

*Primary Examiner* — Wilson W Tsui
(74) *Attorney, Agent, or Firm* — Fish & Richardson P.C.

(57) ABSTRACT

Methods, systems, and apparatus, including computer programs encoded on computer storage media, for transforming and classifying text based on analysis of training texts from particular authors. One of the methods includes receiving an input text including one or more words and a requested author; generating a vector stream representing the input text based on an encoder language model and including one or more multi-dimensional vectors associated with associated words of the words of the input text and representing a distribution of contexts in which the associated words occurred in a plurality of training texts; and producing an output text representing a particular transformation of the input text based at least in part on a decoder language model, the generated vector stream, and the requested author.

13 Claims, 5 Drawing Sheets

(51) Int. Cl.
*G06F 17/27* (2006.01)
*G06F 17/30* (2006.01)
*G06F 17/24* (2006.01)
*G06F 17/28* (2006.01)
*G06N 3/08* (2006.01)
*G06N 3/04* (2006.01)

(52) U.S. Cl.
CPC ........ *G06F 17/28* (2013.01); *G06F 17/30705* (2013.01); *G06N 3/0454* (2013.01); *G06N 3/08* (2013.01)

(58) Field of Classification Search
USPC .......................................................... 715/271
See application file for complete search history.

(56) References Cited

U.S. PATENT DOCUMENTS

| | | | | |
|---|---|---|---|---|
| 9,720,978 | B1* | 8/2017 | Peterson | G06F 17/3053 |
| 2006/0265209 | A1* | 11/2006 | Bradford | G06F 17/2809 |
| | | | | 704/9 |
| 2007/0073532 | A1* | 3/2007 | Brockett | G06F 17/274 |
| | | | | 704/9 |
| 2007/0288458 | A1* | 12/2007 | Kacmarcik | G06F 17/274 |
| 2009/0300046 | A1* | 12/2009 | Abouyounes | G06F 17/30265 |
| 2011/0320191 | A1* | 12/2011 | Makeyev | G06F 17/2785 |
| | | | | 704/9 |
| 2012/0251016 | A1 | 10/2012 | Lyons et al. | |
| 2014/0222928 | A1* | 8/2014 | Scholtes | H04L 51/046 |
| | | | | 709/206 |
| 2015/0269125 | A1* | 9/2015 | Desai | G06F 17/212 |
| | | | | 715/752 |
| 2016/0162576 | A1* | 6/2016 | Arino de la Rubia | G06F 17/2765 |
| | | | | 707/739 |
| 2017/0228591 | A1* | 8/2017 | Simske | G06K 9/00469 |

OTHER PUBLICATIONS

Perlroth, "Software Helps Identify Anonymous Writers or Helps Them Stay That Way", Jan. 3, 2012, published by The New York Times, located at https://bits.blogs.nytimes.com/2012/01/03/software-helps-identify-anonymous-writers-or-helps-them-stay-that-way/.*

Mazur, "A Step by Step Backpropagation Example", published Mar. 17, 2015, published at https://mattmazur.com/2015/03/17/a-step-by-step-backpropagation-example/, pp. 1-9*

Khosmood et al. "Automatic Synonym and Phrase Replacement Show Promise for Style Transformation," 2010 Ninth IEEE International Conference on Machine Learning and Applications, Dec. 2010, Washington DC, USA, pp. 12-14.

Khosmood et al. "Automatic Natural Language Classification and Transformation," BCS Corpus Profiling Workshop, 2008, London, UK.

Khosmood et al. "Toward Automated Stylistic Transformation of Natural Language Text," Digital Humanities 2009, Washington DC USA.

European Search Report in European Application No. 16139014.6, dated Nov. 29, 2016, 8 pages.

Mikolov et al. "Efficient Estimation of Word Representations in Vector Space," arXiv 1301.3781v3, Sep. 7, 2013, 12 pages.

Goldberg et al. "Word2vec Explained: Deriving Mikolov et al.'s Negative-Sampling Word-Embedding Method," arXiv 1402.3722v1, Feb. 15, 2014, 5 pages.

* cited by examiner

TEXT CLASSIFICATION AND TRANSFORMATION BASED ON AUTHOR

CROSS REFERENCE TO RELATED APPLICATION

This application claims the benefit of U.S. Provisional Application No. 62/202,601, filed Aug. 7, 2015, the contents of which are hereby incorporated in its entirety.

BACKGROUND

This specification describes technologies that relate to transforming and classifying text based on analysis of training texts from particular authors.

Text authoring applications, e.g., word processors, email clients, web browsers, and other applications, accept text input from a user via a keyboard or other input device. In some cases, these applications may allow text to be formatted and arranged by the users. Some applications may analyze the input text to identify common errors, for example, spelling errors, grammar errors, or formatting errors.

SUMMARY

This specification describes technologies that relate to rewriting text in a requested linguistic style. In general, one innovative aspect of the subject matter described in this specification can be embodied in methods that include the actions of receiving an input text including one or more words and a name of a requested author; generating a vector stream representing the input text based on an encoder language model, wherein the vector stream includes one or more multi-dimensional vectors each associated with one or more associated words of the words of the input text and representing a distribution of contexts in which the associated words occurred in a plurality of training texts processed by the encoder language model; and producing an output text representing a particular transformation of the input text based at least in part on a decoder language model, the generated vector stream, and the requested author, wherein the decoder language model stores distributions of words used by particular authors in the plurality of training texts that caused the encoder language model to produce particular vectors representing the words.

Another innovative aspect of the subject matter described in this specification can be embodied in methods that include the actions of receiving an input text including one or more words and a name of a requested author; generating a vector stream representing the input text based on an encoder language model, wherein the vector stream includes one or more multi-dimensional vectors each associated with one or more associated words of the words of the input text and representing a distribution of contexts in which the associated words occurred in a plurality of training texts processed by the encoder language model; and producing a classification of the input text based on a decoder language model, the generated vector stream, the input text and the author, wherein the decoder language model stores distributions of words used by particular authors in the plurality of training texts that caused the encoder language model to produce particular vectors representing the words.

The subject matter described in this specification can be implemented in particular embodiments so as to realize one or more of the following advantages. By allowing a user to transform input text to the style of a particular author, the input text may be changed to use words and phrases common for a particular type of writing associated with the target author, which may make it more likely that the text will be understood by an audience expecting that type of writing. Further, input text may be transformed to a style expected by audience for the text, making it more likely that the text will be well received by the audience. For example, an input text could be transformed to a style used by an intended recipient of an email containing the input text based on email messages previously sent by the intended recipient. Moreover, an author of an input text may be able to improve the quality of the input text by transforming it to the style of a respected author, for example in the case of an input text author who is not a native speaker of the language of the input text.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes techniques for transforming and classifying text using language models trained with text from different authors. For example, an input text provided by a user can be transformed into an output text written in the style of a particular author requested by the user. The transformation can be performed using language models that have previously analyzed texts written by the particular author and modeled the words the author used in the context of those texts. From this information, the language models can predict the most likely words the particular author would use in the context of the input text, and produce an output text reflecting these predictions. The output text, therefore, is a transformation of the input text into the linguistic style of the particular author. For example, given an input text of "what is that light in the window," and a requested author of "William Shakespeare," the input text may be transformed into an output text representing how William Shakespeare would likely have written the input text based on language models generated from analysis of his work. In such a case, the input text of "what is that light in the window" could be transformed, for example, into "what light through yonder window breaks."

In another example, the opposite transformation (e.g., from "what light through yonder window breaks" to "what is that light in the window") could be performed. Such a transformation may be performed by using the William Shakespeare text as input text (with Shakespeare identified as the author of the input text) and by specifying the person requesting the transformation as the requested author. The text would be transformed into the style of the person requesting the transformation based on previously analyzed and modeled text written by the person (e.g., emails, articles, etc.).

Other transformations can also be performed using these techniques. For example, a user may request that the input text be transformed into a style common to a particular group of authors, e.g., based on text produced by employees of a particular company, text by authors writing in a particular field, text by authors published in a particular journal, or other groups.

One example method for transforming input text includes receiving an input text including one or more words and a name of a requested author. A vector stream representing the input text is then generated based on an encoder language model. The vector stream includes one or more multi-dimensional vectors each associated with one or more associated words of the words of the input text, and represents a distribution of contexts in which the associated words occurred in a plurality of training texts processed by the encoder language model. An output text representing a particular transformation of the input text is then produced based at least in part on a decoder language model, the generated vector stream, and the requested author. The decoder language model stores distributions of words used by particular authors in the plurality of training texts that caused the encoder language model to produce particular vectors representing the words.

Using the present techniques, an input text may also be classified using language models trained with text from different authors. For example, an input text by a particular author can be classified as either "satire" or "non-satire." In another example, an input text can be classified according to the most likely author to have written the input text.

One example method for classifying input texts includes receiving an input text including one or more words and a name of a requested author. A vector stream representing the input text is generated based on an encoder language model. The vector stream includes one or more multi-dimensional vectors each associated with one or more associated words of the words of the input text, and represents a distribution of contexts in which the associated words occurred in a plurality of training texts processed by the encoder language model. A classification of the input text is then produced based on a decoder language model, the generated vector stream, the input text and the author. The decoder language model stores distributions of words used by particular authors in the plurality of training texts that caused the encoder language model to produce particular vectors representing the words.

Figure 1:
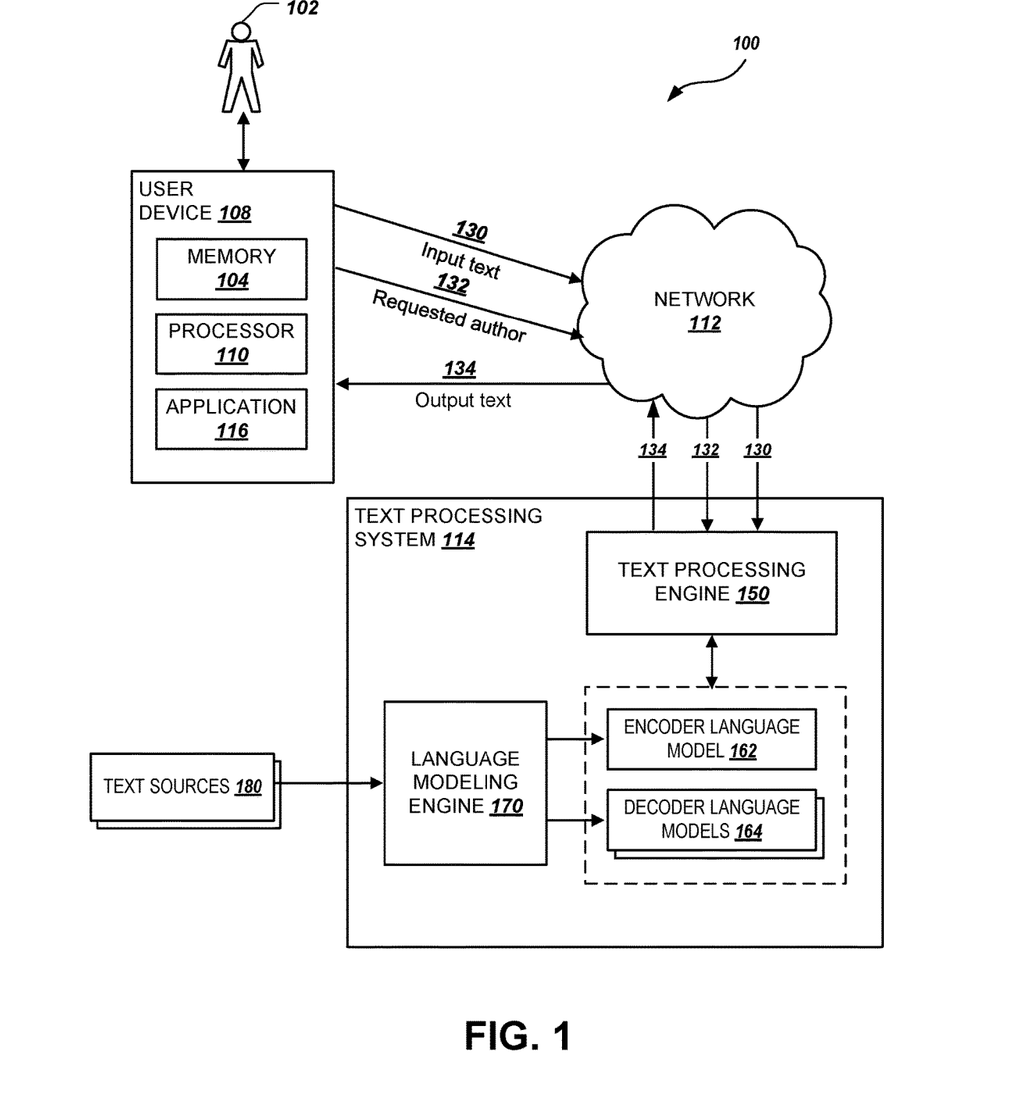
FIG. 1 shows an example system for transforming and classifying text using language models trained with text from different authors.

FIG. 1 shows an example system 100 for transforming and classifying text using language models trained with text from different authors. The system 100 includes the user device 108 connected to a text processing system 114 by a network 112. In operation, the user device 108 sends an input text 130 and a name of a requested author 132 to the text processing system 114 over the network 112. A text processing engine 150 in the text processing system 114 transforms the input text 130 into an output text 134 using the encoder language model 162 and one or more decoder language models 164. In some cases, the text processing engine 150 can classify the input text 130 using the encoder language model 162 and the decoder language models 164. The encoder language model 162 and the decoder language models 164 are generated by a language modeling engine 170 in the text processing system 114. The language modeling engine 170 analyzes text sources 180 to generate the encoder language model 162 and the decoder language models 164. These processes are described in greater detail below.

The system 100 includes the user device 108 that is used by a user 102 to access the text processing system 114. The user device 108 may be a computing device configured to receive text input from the user 102, including, for example, a desktop computer, a laptop computer, a phone, a tablet, or other types of computing device. The user device 108 may include one or more input devices allowing the user to enter input text, including, but not limited to, a keyboard, a touchscreen, a speech recognition system, a mouse, or other input devices. The user device 108 will generally include a memory 104, e.g., a random access memory (RAM), flash, or other storage device, for storing instructions and data and a processor 110 for executing stored instructions.

The user device 108 also includes a processor 110. Although illustrated as a single processor 110 in FIG. 1, two or more processors may be included in particular implementations of system 100. The processor 110 may be a central processing unit (CPU), an application specific integrated circuit (ASIC), a field-programmable gate array (FPGA), or another suitable component. The processor 110 may also be a single processor core of a larger processor including multiple integrated processor cores.

The user device 108 may also include a text processing application 116 configured to receive input text from the user 102, for example, through a text input device such as a keyboard, or by identification of a text document or other text resource. In some cases, the text processing application 116 may be a software application executed by the processor 110 and stored in the memory 104, for example, a word processor, an email client, a web browser, a presentation application, a graphics application, or other types of application that allows the user to input or identify text.

The text processing application 116 may allow the user to select a requested linguistic style to transform the input text. For example, the text processing application 116 may present the user with a list of available authors, and allow the user to select the requested author from the list. In some cases, the list can allow the user to select a group of authors including multiple authors.

The user device 108 is connected to the text processing system 114 by a data communication network 112. The network 112 may be a public or private network configured to send information electronically between connected devices. The network 112 can use one or more communications protocols for sending the information, for example, ETHERNET, Internet Protocol (IP), Transmission Control Protocol (TCP), Universal Datagram Protocol (UDP), SONET, cellular data protocols such as CDMA and LTE, 802.11x wireless protocols, or other protocols. In some cases, the network 112 can include a local area network (LAN) or wide area network (WAN), e.g., the Internet, or a combination of networks, any of which may include wireless links.

The user device 108 sends the input text 130 and the name of the requested author 132 to the text processing system 114 over the network 112. In some cases, the text processing application 114 may also allow the user to specify a particular portion of the entered text as input text 130, for example, by allowing the user to select the input text 130 using an input device. The input text 130 may also be entered directly by the user.

The text processing system 114 may include a server or set of servers connected to the network 112 and operable to perform the operations described below. The text processing system 114 may include one or more processors and one or more memories for performing these operations.

The text processing engine 150 receives the input text 130 and the name of the requested author 132, and transforms the input text 130 into an output text 134 written in the requested linguistic style. In some cases, the text processing engine 150 may classify the input text 130 based on the language models 162 and 164. The text processing engine 150 transforms the input text 130 based on the based on the encoder language model 162 and the decoder language models 164. In some implementations, the text processing engine 150 can be a software program or set of software programs executed by the text processing system 114 to perform these operations. In some cases, the text processing engine 150 may receive an indication from the user of a type of transformation or classification to perform on the input text 130, and may select an appropriate decoder language model 164 to perform the requested transformation or classification. For example, the user may request that the input text 130 should be rewritten in the style of the requested author. In some cases, each decoder language model 164 is configured and trained to perform a different type of transformation or classification.

The encoder language model 162 represents distributions of contexts in which words or groups of words, e.g. phrases, occurred in text sources 180 processed by the encoder language model 162. In some cases, the encoder language model 162 includes an artificial neural network model trained using the text sources 180. The artificial neural network model can model the words or phrases occurring in the input text as points in a high dimensional space. For example, the artificial neural network model can use the word2vec library (available at https://code.google.com/p/word2vec/) to represent the context distributions of words in the text sources 180. The artificial neural network model can also use other techniques, e.g., Bag of Words (BOW), recurrent neural network (RNN) models, long-short term memory (LSTM) models, or other techniques or combinations of techniques. These techniques can also be varied to, for example, include longer time span averages and explicit attention mechanisms. The artificial neural network model can take text as input and produce an output vector mapping each of the words or phrases in the input text to a point in the high dimensional space. During training, the text from the text sources 180 can be passed as input to the encoder language model 162. At runtime (i.e., after training), the input text 130 can be passed as input to obtain a vector stream representation of the input text 130.

During training, the vector streams produced by the encoder language model 162 are passed as input to the one or more decoder language models 164, along with an author of the corresponding text source 180 and the text itself. The decoder language models 164 are configured to produce particular output text or classifications for a given vector stream, author, and input text combination. For example, a particular decoder language model 164 may be configured and trained to produce output text representing a transformation of an input text to the particular style of the requested author. In this case, the decoder language model 164 may represent distributions of words used by particular authors in the text sources 180 that were mapped to particular word vectors by the encoder language model 162. Given a particular vector, the decoder language model 164 can produce the word or phrase the requested author would most likely use.

At runtime, the input text 130 is processed by the encoder language model 162 to produce a vector stream representing the input text 130. The vector stream, and the requested author 132 are passed to one of the decoder language models 164. The decoder language model examines the vector stream and the name of the requested author 132, and produces an appropriate transformation (e.g., an output text) or an appropriate classification (e.g., satire/non-satire) depending on the task it is configured and trained to perform.

Although FIG. 1 shows the user device interacting with the text processing system 114 over a network 112, in some implementations, some or all of the components of the text processing system 114 may integrated into the user device 108 and the network 112 may be omitted. In some cases, the text processing system 114 may be a distributed computing environment including multiple computing devices connected by a network. In such cases, the analysis performed by the encoder language model 162 and the decoder language models may be performed across multiple computing devices at least partially in parallel.

Figure 2:
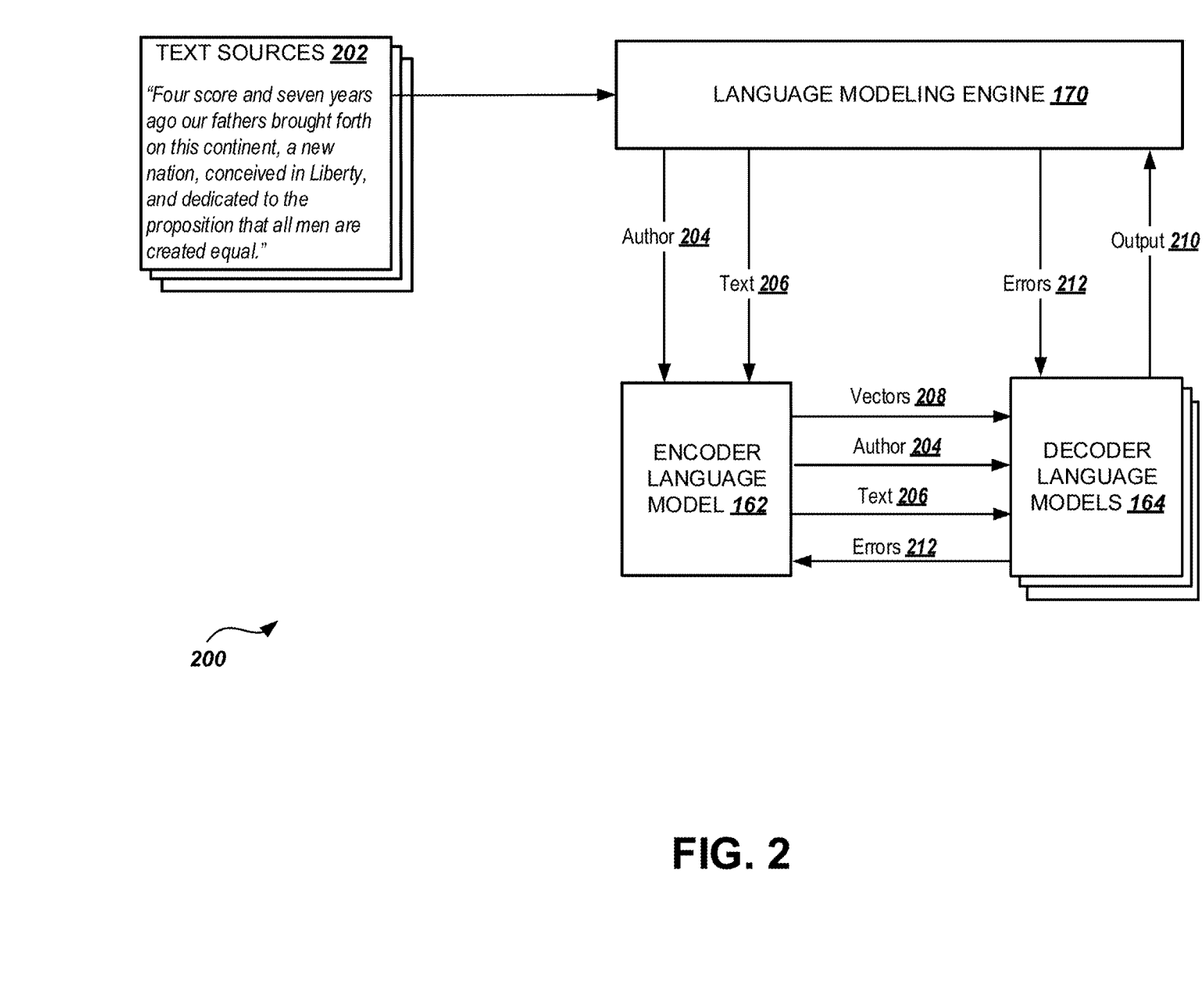
FIG. 2 shows an example system for training an encoder language model and decoder language models

FIG. 2 shows an example system 200 for training the encoder language model 162 and the decoder language models 164. The language modeling engine 170 presents input text 206 from text sources 202 to the encoder language model 162, which produces a vector stream 208 representing the input text 206. The language modeling engine 170 also presents an author 204 associated with the input text 206 to the encoder language model 162.

The encoder language model 162 presents the vector stream 208 representing the input text 206, the author 204, and the input text 206 to each of the decoder language models 164. In some cases, the language modeling engine 170 presents the author 204 to the decoder language models 164 directly, while in other cases the author 204 is passed by the encoder language model 162 to the decoder language models 164. Each decoder language model 164 produces an output 210 representing a transformation or classification of the input text 206 based on the author 204 and the vector stream 208, as described above.

The language modeling engine 170 receives the outputs 210 from each decoder language model 164, and analyzes them for errors. For example, the language modeling engine 170 may compare an output 210 for an expected output given the input text 206. If the output 210 differs, the language modeling engine 170 indicates an error 212 to the decoder language model 164 that produced the output 210. The decoder language model 164 updates its representation of the vectors in the vector stream 208 in response to the error 212. The decoder language model 164 also backpropagates the error 212 to the encoder language model 162, which corrects its representations in response.

The text sources 202 may be documents selected as representative of a particular author. For example, the text source 202 shown in FIG. 2 include text from the Gettysburg address, and may represent the style of the author "Abraham Lincoln." By analyzing a large number of text sources 202, the accuracy of the encoder language model 162 and the decoder language models 164 can be improved. In some implementations, the text sources 202 may include webpages, scanned text from books or periodicals, ASCII or Unicode text files, Portable Document Format (PDF) files, email messages sent or received by a particular person or group of persons (representing an email style of the particular persons), or other types of text. In some cases, text sources 202 without a known author may be analyzed. Analysis of such text sources can be performed by associating all text sources 202 without a known author with an anonymous author. Doing so may assist in forming a representation of general word usage in the English language not particular to a single author.

Figure 3:
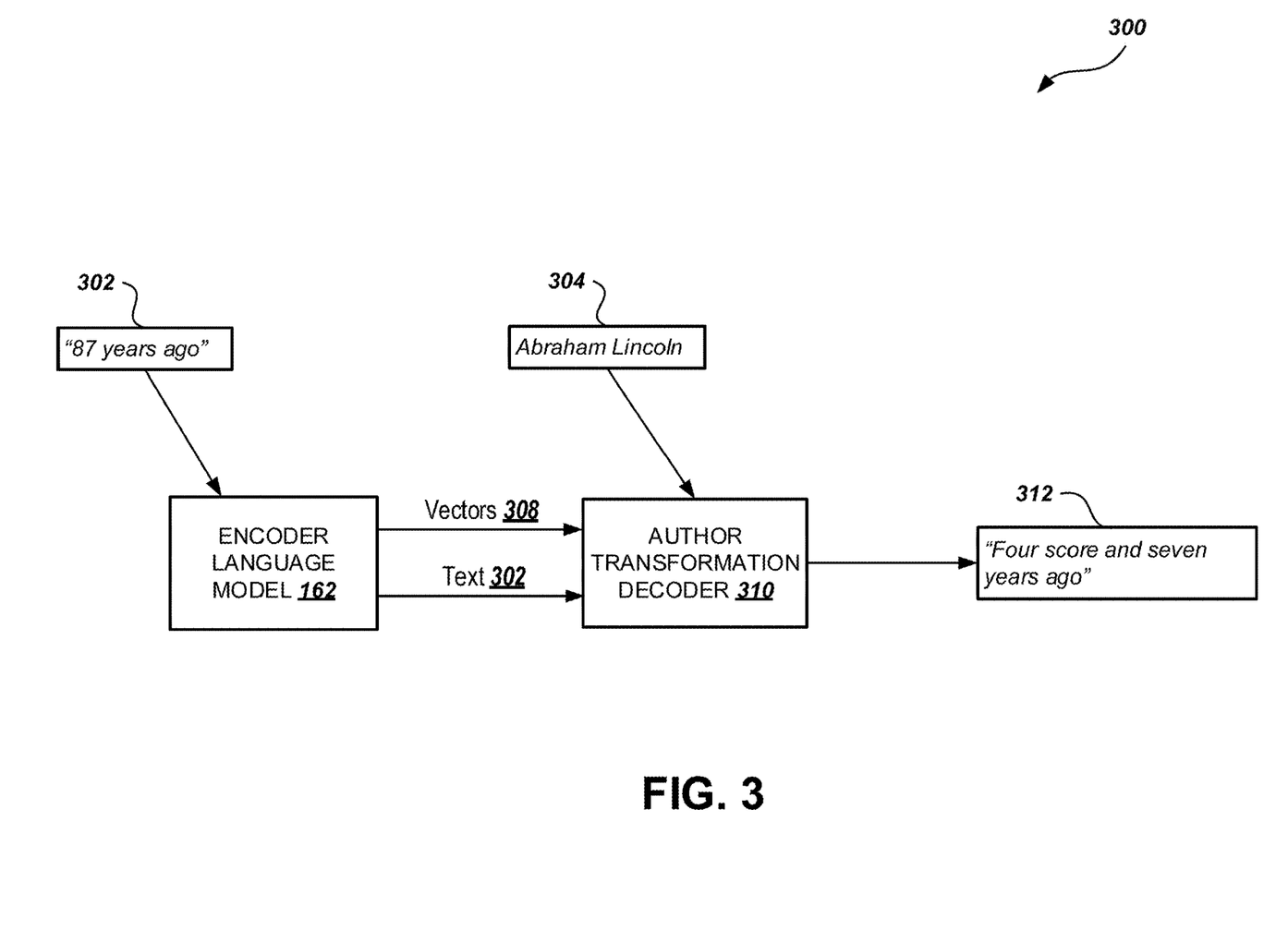
FIG. 3 shows an example system for transforming input text into an output text rewritten according to the style of a particular author.

FIG. 3 shows an example system 300 for transforming input text 302 into an output text 312 rewritten according to the style of a particular author 304. The depicted interaction generally occurs after the encoder language model 162 and the decoder language models 164 are trained, e.g., as shown in FIG. 2. The system 300 includes an author transformation decoder 310, which is one of the decoder language models 164 configured to perform a transformation of input text 302 to the style of a particular author.

The encoder language model 162 is presented with input text 302. In the illustrated example, the input text 302 is "87 years ago." The encoder language model 162 analyzes the input text 302 and produces a vector stream 308 representing the input text 302. The encoder language model 162 presents the vector stream 308 to the author transformation decoder 310 along with the input text 302. The author transformation decoder also takes the author 304 as input, which in this example is "Abraham Lincoln." In some cases, the encoder language model 162 receives the author 304 as input, and passes it along to the author transformation decoder 310. The transformation decoder 310 produces the output text 312 representing the input text 302 rewritten in the style of the requested author 304. In the example shown, the input text "87 years ago" has been transformed into the output text "Four score and seven years ago," which represents the input text as it would likely have been written by Abraham Lincoln.

Figure 4:
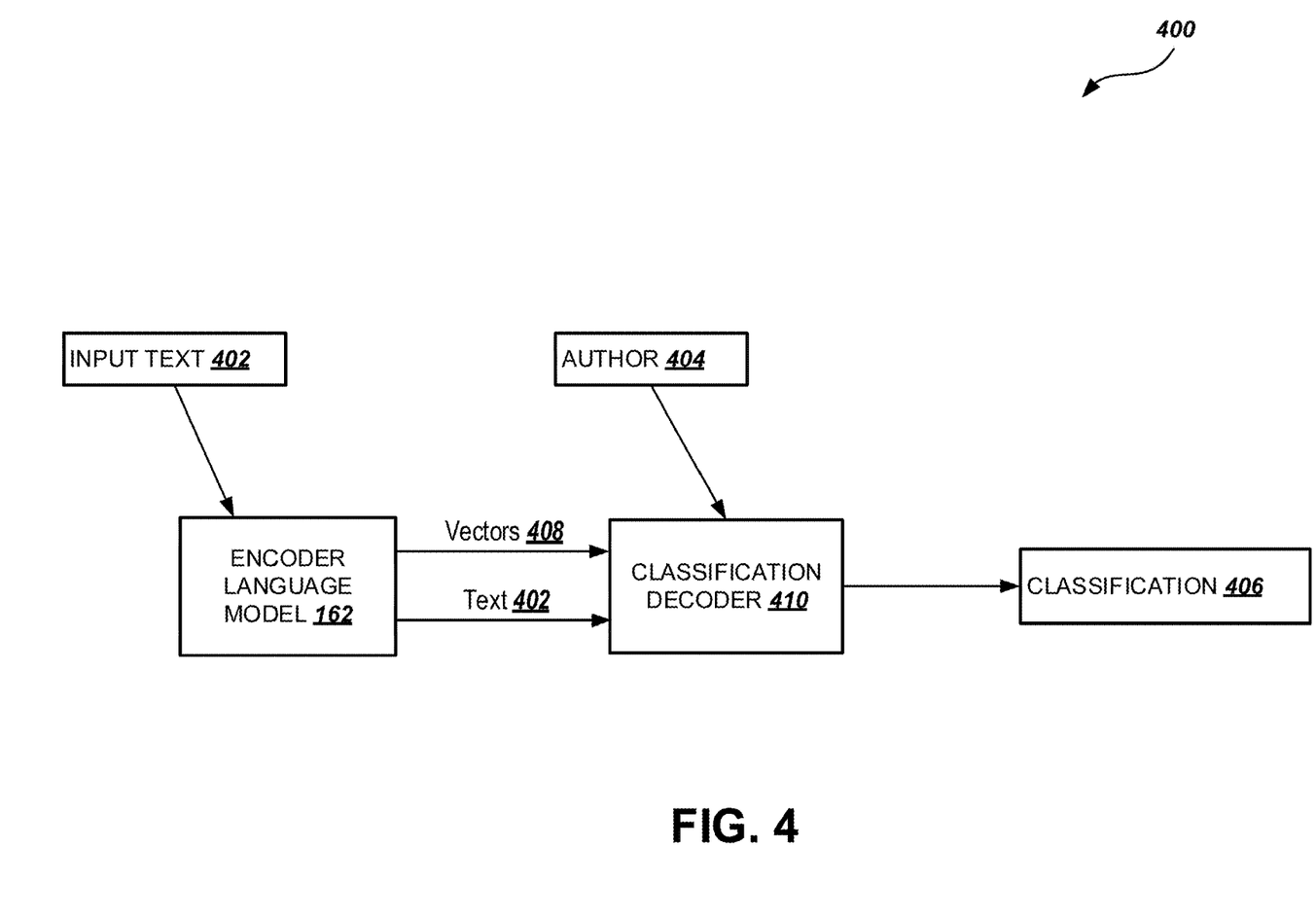
FIG. 4 shows an example system for producing a classification of an input text.

FIG. 4 shows an example system 400 for producing a classification 406 of an input text 402. The depicted interaction generally occurs after the encoder language model 162 and the decoder language models 164 are trained, e.g., as shown in FIG. 2. The system 400 includes a classification decoder 410, which is one of the decoder language models 164 configured to classify input text as satire or non-satire.

The encoder language model 162 is presented with input text 402. The encoder language model 162 analyzes the input text 402 and produces a vector stream 408 representing the input text 402. The encoder language model 162 presents the vector stream 408 to the classification decoder 410 along with the input text 402. The classification decoder 410 also takes the author 404 as input. In some cases, the encoder language model 162 receives the author 404 as input, and passes it along to the classification decoder 410. The classification decoder 410 produces the classification 406 for the input text 402 based on the vector stream 408, the input 402, and the author 404. For example, the input text 402 may be text purporting to be a news story, and the classification 406 may be an indication whether the news story is legitimate news or satire.

Figure 5:
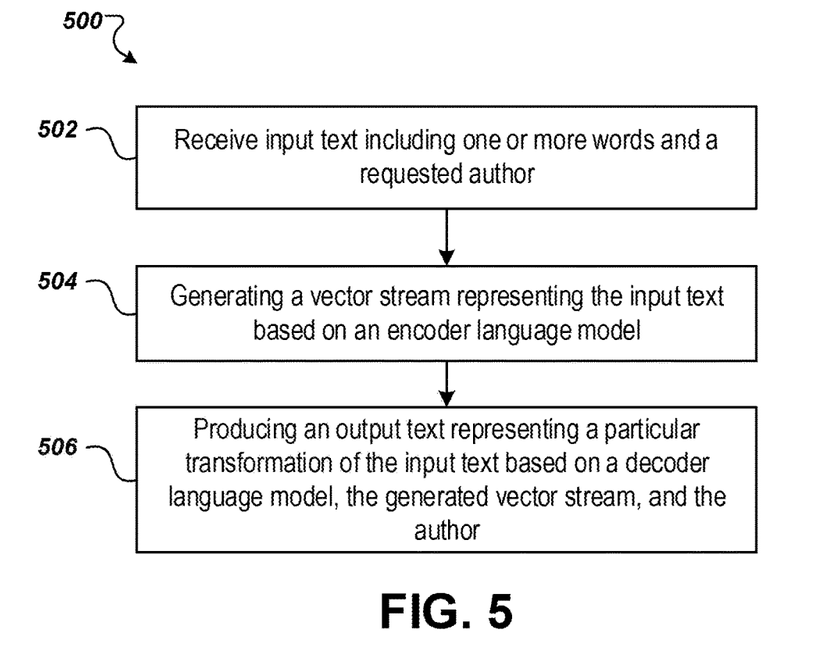
FIG. 5 is a flow diagram of an example process for transforming input text into an output text rewritten according to the style of a particular author.

FIG. 5 is a flow diagram of an example process 500 for transforming input text into an output text rewritten according to the style of a particular author. An input text including one or more words, and a name of a requested author are received (502). A vector stream is generated representing the input text using an encoder language model (504). In some cases, the vector stream includes one or more multi-dimensional vectors each associated with one or more associated words of the words of the input text and represents a distribution of contexts in which the associated words occurred in a plurality of training texts processed by the encoder language model.

An output text is produced representing a particular transformation of the input text based at least in part on a decoder language model, the generated vector stream, and the name of the requested author (506). In some cases, the decoder language model stores distributions of words used by particular authors in the plurality of training texts that caused the encoder language model to produce particular vectors representing the words. In some implementations, the particular transformation of the input text is a transformation of the input text into text written in the style of the requested author. In some cases, an original author of the input text is also received, and producing the output text is performed based at least in part on the original author. The encoder language model and decoder language model may be neural network models.

The process 500 may also include training the encoder language model using at least the plurality of training texts and training the decoder language using at least a vector stream generated by the encoder language model representing the plurality of training texts, the plurality of training texts, and a particular author associated with each training text. The particular author may include one or more co-authors of the associated training text. In some cases, the particular author may be an anonymous author associated with training texts for which an author is not known. In some cases, the requested author includes one or more of the particular authors of the plurality of training texts.

Figure 6:
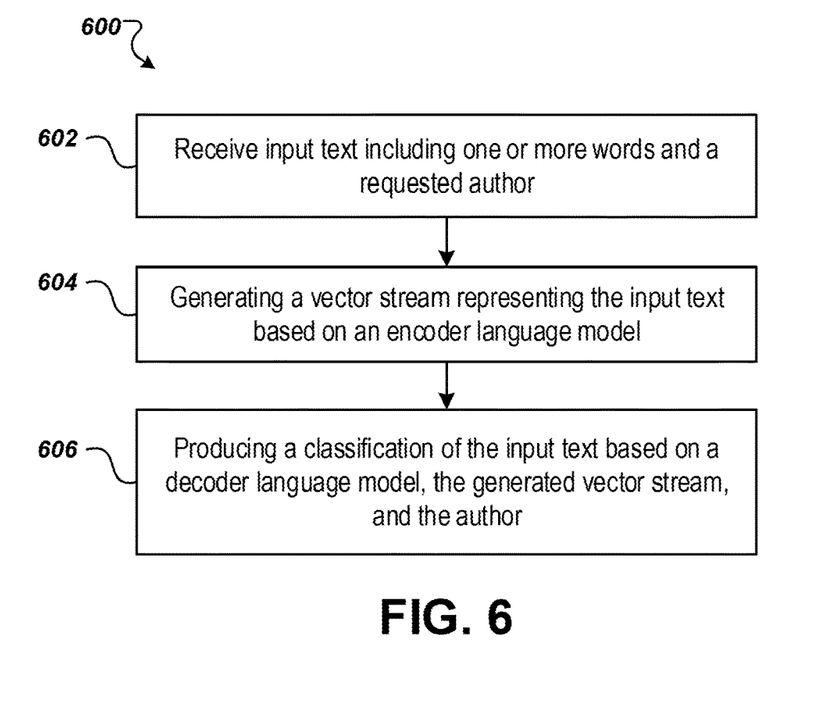
FIG. 6 is a flow diagram of an example process for producing a classification of an input text Like reference numbers and designations in the various drawings indicate like elements.

FIG. 6 is a flow diagram of an example process 600 for producing a classification of an input text. An input text including one or more words, and data identifying a requested author are received (602). A vector stream is generated representing the input text based on an encoder language model (604). The vector stream includes one or more multi-dimensional vectors each associated with one or more associated words of the words of the input text and representing a distribution of contexts in which the associated words occurred in a plurality of training texts processed by the encoder language model A classification of the input text is produced based on a decoder language model, the generated vector stream, the input text and the author (606). In some cases, the decoder language model stores distributions of words used by particular authors in the plurality of training texts that caused the encoder language model to produce particular vectors representing the words. In some cases, the classification of the input text includes a satire indication, a non-satire indication, a predicted author indication, or a relevance indication. In some cases, an original author of the input text is also received, and producing the output text is performed based at least in part on the original author. The encoder language model and decoder language model may be neural network models.

In some cases, the process 600 includes training the encoder language model using at least the plurality of training texts, and training the decoder language using at least a vector stream generated by the encoder language model representing the plurality of training texts, the plurality of training texts, and a particular author associated with each training text. The particular author may include one or more co-authors of the associated training text. In some cases, the particular author may be an anonymous author associated with training texts for which an author is not known. The requested author may include one or more of the particular authors of the plurality of training texts.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by a system comprising one or more computers to generate an output text in a style of a requested author from an input text, wherein the output text and the input text are written in a same natural language, the system comprising an encoder language model and a decoder language model, wherein:
    the encoder and decoder language model have been trained with text from multiple authors, the text from multiple authors comprising a plurality of training texts;
    as a result of training, the encoder language model stores data representing words occurring in the plurality of training texts from the multiple authors as respective vectors, wherein each vector represents a respective distribution of contexts in the plurality of training texts of a respective word from the plurality of training texts;
    as a result of training, the decoder language model (i) stores the distributions of contexts of words used by particular respective authors in the plurality of training texts and (ii) is configured to perform a transformation of a stream of vectors from the encoder language model to generate text in the natural language according to distributions of contexts of words used by a decoder author, the decoder author being one of the multiple authors;
    the encoder and decoder language model have been trained by performing the following operations for each of multiple training input texts each having a respective author:
        presenting each training input text to the encoder language model;
        receiving from the encoder language model a training vector stream representing the training input text, wherein the training vector stream includes vectors that are each (i) associated with a word from the input text and (ii) based on the distribution of contexts of the word in the plurality of training texts;
        presenting the training vector stream, an author of the training input text, and the training input text to the decoder language model;
        receiving a respective decoder output training text from the decoder language model based on the author, the training input text, and the training vector stream;
        comparing the decoder output of the decoder language model with an expected output for the author and the training input text, wherein the expected output is the training input text;
        if the comparing indicates a difference for a particular author, indicating an error; and
        in the case of an error, updating the decoder language model, including updating the decoder language model's representation of vectors in the training vector stream, and back-propagating the error to the encoder language model, which updates a representation of the encoder language model;
    the method using the encoder language model and the decoder language model after training, the method comprising:
        receiving an input text including one or more words and a name of a requested author, wherein the requested author is one of the multiple authors;
        generating a vector stream of vectors by the encoder language model, each vector in the vector stream representing the distribution of contexts in which a respective word of the input text appears in training input texts; and
        producing an output text from the vector stream by the decoder language model according to the distributions of contexts of words used by the requested author, whereby the output text is a transformation of the input text to a style of the requested author.

2. The method of claim 1, wherein the requested author includes one or more co-authors.

3. The method of claim 1, wherein the requested author is an anonymous author associated with training texts for which an author is not known.

4. The method of claim 1, further comprising receiving a name of an original author of the input text, wherein producing the output text is performed based at least in part on the original author.

5. The method of claim 1, wherein the encoder language model and decoder language models are artificial neural network models.

6. A method performed by a system comprising one or more computers to produce a classification of an input text, the system comprising an encoder language model and one classification decoder, wherein:
    the encoder language model and the classification decoder have been trained with text from multiple authors, the text from multiple authors comprising a plurality of training texts;
    as a result of training, the encoder language model stores data representing words occurring in the plurality of training texts from the multiple authors as respective vectors, wherein each vector represents a respective distribution of contexts in the plurality of training texts of a respective word from the plurality of training texts;
    as a result of training, the classification decoder (i) stores the distributions of contexts of words used by particular respective authors in the plurality of training texts and (ii) is configured to classify the input text based on distributions of contexts of words used by an author of the input text, the author of the input text being one of the multiple authors;

the encoder language model and the classification decoder have been trained by performing the following operations for each of multiple training input texts each having a respective author:

presenting each training input text to the encoder language model;

receiving from the encoder language model a training vector stream representing the training input text, wherein the training vector stream includes vectors that are each (i) associated with a word from the input text and (ii) based on the distribution of contexts of the word in the plurality of training texts;

presenting the training vector stream, an author of the training input text, and the training input text to the classification decoder;

receiving a classification from the classification decoder based on the author, the training input text, and the training vector stream;

comparing the classification of the classification decoder with an expected classification for the author and the training input text;

if the comparing indicates a difference, indicating an error;

in the case of an error, updating the classification decoder, including updating the classification decoder's representation of vectors in the training vector stream, and back-propagating the error to the encoder language model, which updates a representation of the encoder language model;

the method using the encoder language model and the classification decoder after training, the method comprising:

receiving an input text, wherein the author of the input text is one of the multiple authors;

generating a vector stream of vectors by the encoder language model, each vector in the vector stream representing the distribution of contexts in which a respective word of the input text appears in the training input texts; and producing a classification of the input text from the vector stream by the classification decoder according to the distributions of contexts of words used by the authors of the training texts.

7. The method of claim 6, wherein the classification of the input text includes a satire indication, a non-satire indication, a predicted author indication, or a relevance indication.

8. The method of claim 6, wherein the author of the input text is one or more co-authors, and wherein the classification of the input text includes an indication of each predicted co-author.

9. The method of claim 6, wherein the author of the input text is an anonymous author.

10. The method of claim 6, further comprising receiving a name of an original author of the input text, wherein producing the classification of the input text is performed based at least in part of the original author.

11. The method of claim 6, wherein the encoder language model and classification decoder are artificial neural network models.

12. A system for generating an output text in a style of a requested author from an input text, wherein the output text and the input text are written in a same natural language, the system comprising:

memory for storing data and one or more processors, the memory and processors configured to run an encoder language model and a decoder language models, wherein:

the encoder and decoder language model have been trained with text from multiple authors, the text from multiple authors comprising a plurality of training texts;

as a result of training, the encoder language model stores data representing words occurring in the plurality of training texts from the multiple authors as respective vectors, wherein each vector represents a respective distribution of contexts in the plurality of training texts of a respective word from the plurality of training texts;

as a result of training, the decoder language model (i) stores the distributions of contexts of words used by particular respective authors in the plurality of training texts and (ii) is configured to perform a transformation of a stream of vectors from encoder language model to generate text in the natural language according to distributions of contexts of words used by a decoder author, the decoder author being one of the multiple authors;

the encoder and decoder language model have been trained by performing the following operations for each of multiple training input texts each having a respective author:

presenting each training input text to the encoder language model;

receiving from the encoder language model a training vector stream representing the training input text, wherein the training vector stream includes vectors that are each (i) associated with a word from the input text and (ii) based on the distribution of contexts of the word in the plurality of training texts;

presenting the training vector stream, an author of the training input text, and the training input text to the decoder language model;

receiving a respective decoder output training text from the decoder language model based on the author, the training input text, and the training vector stream;

comparing the decoder output of the decoder language model with an expected output for the author and the training input text, wherein the expected output is the training input text;

if the comparing indicates a difference for a particular author, indicating an error;

in the case of an error, updating the decoder language model, including updating the decoder language model's representation of vectors in the training vector stream, and back-propagating the error to the encoder language model, which updates a representation of the encoder language model;

the system operable to perform operations, using the encoder language model and the decoder language model after training, comprising:

receiving an input text including one or more words and a name of a requested author, wherein the requested author is one of the multiple authors;

generating a vector stream of vectors by the encoder language model, each vector in the vector stream representing the distribution of contexts in which a respective word of the input text appears in the training input texts; and producing an output text from the vector stream by the decoder language model according to the distribution of contexts of words used by the requested author, whereby the output text is a transformation of the input text to a style of the requested author.

13. The system of claim 12, wherein the encoder language model and decoder language model are Word2Vec models.

* * * * *